Figure 1:
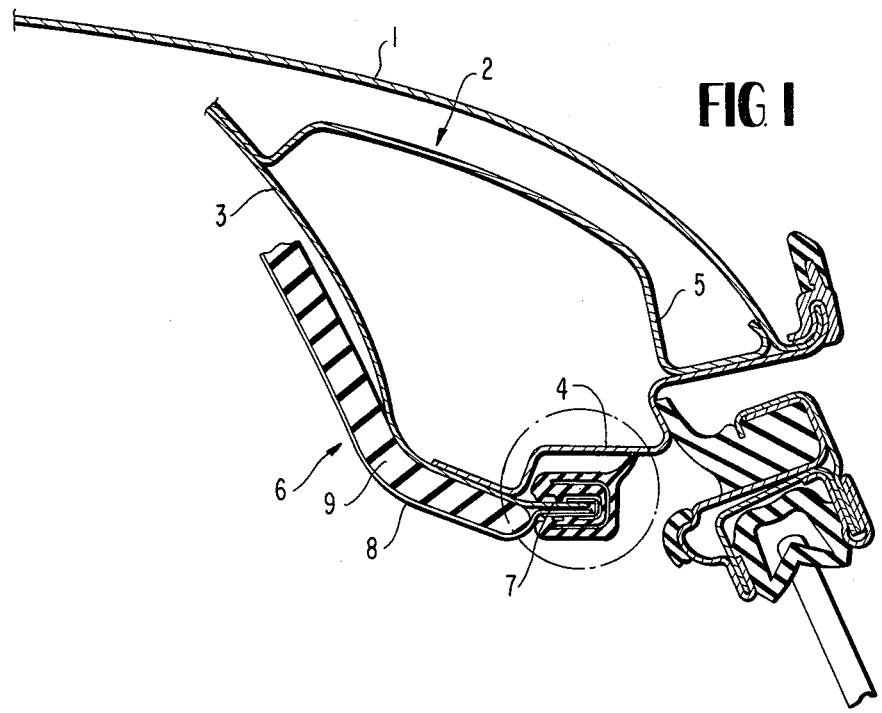

United States Patent [19]

Kania et al.

[11] 4,099,767
[45] Jul. 11, 1978

[54] FASTENING OF THE INNER ROOF COVERING OF MOTOR VEHICLES

[75] Inventors: Siegmund Kania, Sindelfingen; Gerhard Zweigart; Karl Luz, both of Aidlingen; Edgar Lutz, Althengstett, all of Fed. Rep. of Germany

[73] Assignee: Daimler-Benz Aktiengesellschaft, Fed. Rep. of Germany

[21] Appl. No.: 475,177

[22] Filed: May 31, 1974

[30] Foreign Application Priority Data

Jun. 2, 1973 [DE] Fed. Rep. of Germany ....... 2328173

[51] Int. Cl.² .............................................. B60J 7/00
[52] U.S. Cl. ................................. 296/137 A; 280/751
[58] Field of Search ............ 296/137 A, 137 R, 39 R, 296/39 A; 52/716; 280/150 B

[56] References Cited

U.S. PATENT DOCUMENTS

| 2,111,458 | 1/1937 | McHargue .................... 296/137 A |
| 3,065,022 | 11/1962 | Schutte ....................... 296/137 A |
| 3,097,015 | 7/1963 | Nagel .......................... 296/137 A |
| 3,195,948 | 7/1965 | Sturtevant et al. ........... 296/137 A |
| 3,433,526 | 3/1969 | Field et al. .................... 296/137 A |

FOREIGN PATENT DOCUMENTS 1,555,667    9/1972    Fed. Rep. of Germany ... 296/137 A

*Primary Examiner*—Albert J. Makay
*Attorney, Agent, or Firm*—Craig & Antonelli

[57] ABSTRACT

A fastening arrangement for the inner roof covering of motor vehicles at a flange of the roof frame, in which the flange points outwardly and the edge of the roof covering which is constructed approximately U-shaped, surrounds the flange.

18 Claims, 2 Drawing Figures

FASTENING OF THE INNER ROOF COVERING OF MOTOR VEHICLES

The present invention relates to a fastening arrangement of the inner roof covering of motor vehicles at a flange of the roof frame.

Fastening arrangements of the inner roof covering of motor vehicles at flanges projecting from the roof frame are already disclosed in the German Pat. No. 920,295 and in the German Offenlegunsschrift No. 1,555,222. The types of fastening described in these patents, however, entail the disadvantage that they can be used only with plate-shaped, inherently rigid roof coverings. The further disadvantage additionally exists thereby in the case of the German Offenlegunsschrift No. 1,555,222 that the flanges serving for the fastening of the covering point in the direction toward the interior of the vehicle and therewith may lead to endangering the passengers.

Consequently, the present invention is concerned with the task to avoid these disadvantages of the known types of fastening and to find a possibility to secure roof coverings consisting of the usual, customary ceiling or roof material at a flange of the roof frame in a simple manner.

The underlying problems are solved according to the present invention in that the flange points toward the outside and the approximately U-shaped edge of the roof covering surrounds the flange.

Preferably, the U-shaped edge is thereby formed by a retaining rail consisting of conventional synthetic plastic (resinous) material and connected with the roof covering by welding or gluing.

A particularly simple manufacture of the roof frame is made possible if the flange is formed by the inner sheet metal member of the roof frame.

Finally, it is advantageous with respect to the inner security of the vehicle as well as also for optical reasons, if the flange and the edge of the roof covering surrounding the same are covered off by an edge protective profile consisting of rubber or synthetic resinous material.

Accordingly, it is an object of the present invention to provide a fastening arrangement of the inner roof covering of motor vehicles which avoids by simple means the aforementioned shortcomings and drawbacks encountered in the prior art.

Another object of the present invention resides in a fastening of the inner roof covering of motor vehicles which can be applied to the customary roof fabric or covering materials and which is simple in construction and easy to install.

A still further object of the present invention resides in a fastening arrangement of the inner roof covering of motor vehicles which assures ease of installation as well as simplicity of the various parts and relatively low cost in manufacture.

Still another object of the present invention resides in a fastening of the inner roof covering of motor vehicles which not only contributes to the inner safety of the vehicle passengers but ensures an aesthetically pleasing appearance.

Figure 2:
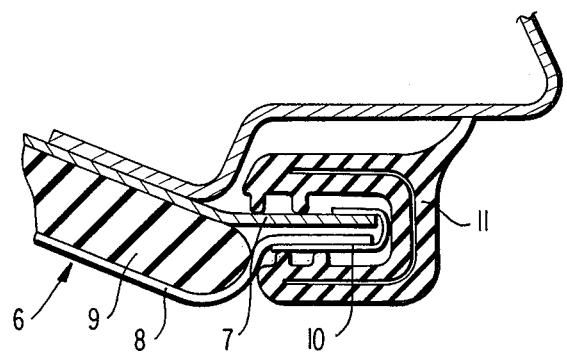

These and further objects, features, and advantages of the present invention will become more obvious from the following description when taken in connection with the accompanying drawing which shows, for purposes of illustration only, one embodiment in accordance with the present invention, and wherein;

FIG. 1 is a partial vertical cross-sectional view through a lateral roof frame of a passenger motor vehicle in accordance with the present invention; and FIG. 2 is a partial cross-sectional view, on an enlarged scale, of the flange illustrated in FIG. 1 and illustrating the details thereof encircled by the dash and dot circle.

Referring now to the drawing wherein like reference numerals are used throughout the two views to designate like parts, a roof frame generally designated by reference numeral 2 is provided which is arranged underneath the roof outer cover panel 1. The roof frame 2 consists of a roof frame inner sheet metal member 3, of a sheet metal border member 4 and of a sheet metal closure member 5. The roof frame inner sheet metal member 3 is thereby extended beyond its connecting place with the border member 4 and thus forms an outwardly pointing flange 7 serving the purpose of fastening thereon the inner roof covering generally designated by reference numeral 6. The inner roof covering 6 which consists of a conventional ceiling material or fabric 8 that is provided at its back side with a foamed material spacer 9, is connected in its edge area with a retaining rail 10, for example, by welding or gluing, which surrounds the flange 7 and therewith serves the fastening along the edge of the roof covering 6 which is retained in its center part by conventional support bars or the like (not shown).

For the complete covering of the flange 7, an edge-protecting profile 11 is mounted over the flange after the assembly of the roof covering 6, which profile may consist of rubber or synthetic resinous material.

In addition to the possibility of a simple fastening of the inner roof covering, additionally the further advantage is achieved by a construction of the roof frame in accordance with the present invention that the outwardly pointing flange considerably increases the internal safety of the vehicle.

While we have shown and described only one embodiment in accordance with the present invention, it is understood that the same is not limited thereto but is susceptible of numerous changes and modifications as kown to those skilled in the art, and we therefore do not wish to be limited to the details ahown and described herein but intend to cover all such changes and modifications as are encompassed by the scope of the appended claims.

What we claim is:

1. A fastening arrangement for an inner roof covering of motor vehicles at a flange means of a roof frame means, characterized in that the flange means points outwardly and terminates in a substantially horizontally extending edge portion disposed at the periphery of a body opening of the vehicle, and that the edge of the roof covering which is constructed approximately U-shaped surrounds the horizontally extending edge portion so as to secure the roof covering at the flange means.

2. A fastening arrangement according to claim 1, characterized in that the flange means is formed by an inner sheet metal member forming part of the roof frame means.

3. A fastening arrangement according to claim 1, characterized in that the flange means and the edge of the roof covering surrounding the flange means is covered off by an edge-protecting profile means.

4. A fastening arrangement according to claim 3, characterized in that the edge-protecting profile means consists of rubber.

5. A fastening arrangement according to claim 3, characterized in that the profile means consists of synthetic resinous material.

6. A fastening arrangement according to claim 3, characterized in that the flange means is formed by an inner sheet metal member forming part of the roof frame means.

7. A fastening arrangement according to claim 1, characterized in that the U-shaped edge of the roof covering is formed by a retaining rail means connected with the roof covering.

8. A fastening arrangement according to claim 7, characterized in that the retaining rail means is a substantially rigid member so as to secure the roof covering at the flange means without being fixedly attached thereto.

9. A fastening arrangement according to claim 8, characterized in that the retaining rail means is welded to the roof covering.

10. A fastening arrangement according to claim 8, characterized in that the retaining rail means is glued to the roof covering.

11. A fastening arrangement according to claim 8, characterized in that the retaining rail means consists of synthetic resinous material.

12. A fastening arrangement according to claim 7, characterized in that the retaining rail means is welded to the roof covering.

13. A fastening arrangement according to claim 7, characterized in that the retaining rail means is glued to the roof covering.

14. A fastening arrangement according to claim 7, characterized in that the retaining rail means consists of synthetic resinous material.

15. A fastening arrangement according to claim 14, characterized in that the flange means is formed by an inner sheet metal member forming part of the roof frame means.

16. A fastening arrangement according to claim 15, characterized in that the flange means and the edge of the roof covering surrounding the flange means is covered off by an edge-protecting profile means.

17. A fastening arrangement according to claim 16, characterized in that the edge-protecting profile means consists of rubber.

18. A fastening arrangement according to claim 16, characterized in that the profile means consists of synthetic resinous material.

* * * * *